Oct. 1, 1940.                F. BLASCHKE                2,216,154
                         AUTOMATIC SPRINKLER
                         Filed Feb. 15, 1939              2 Sheets-Sheet 1
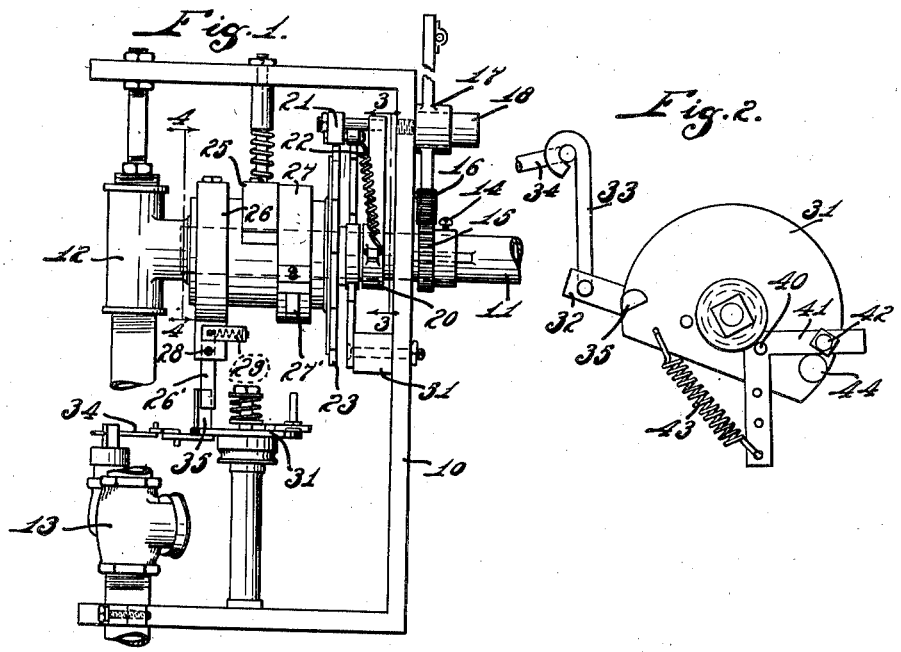
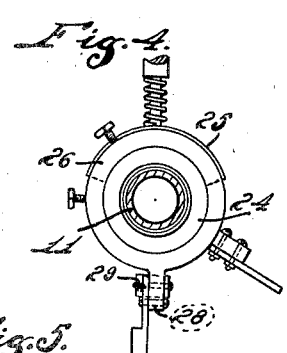
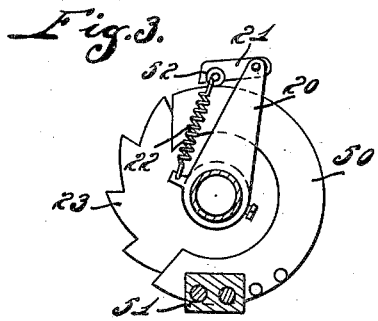
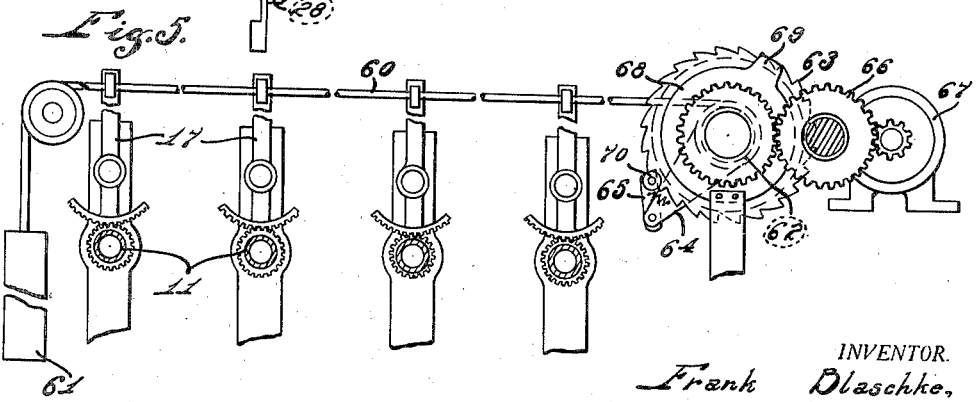
INVENTOR.
Frank Blaschke,
BY
Hood + Hahn.
ATTORNEYS.

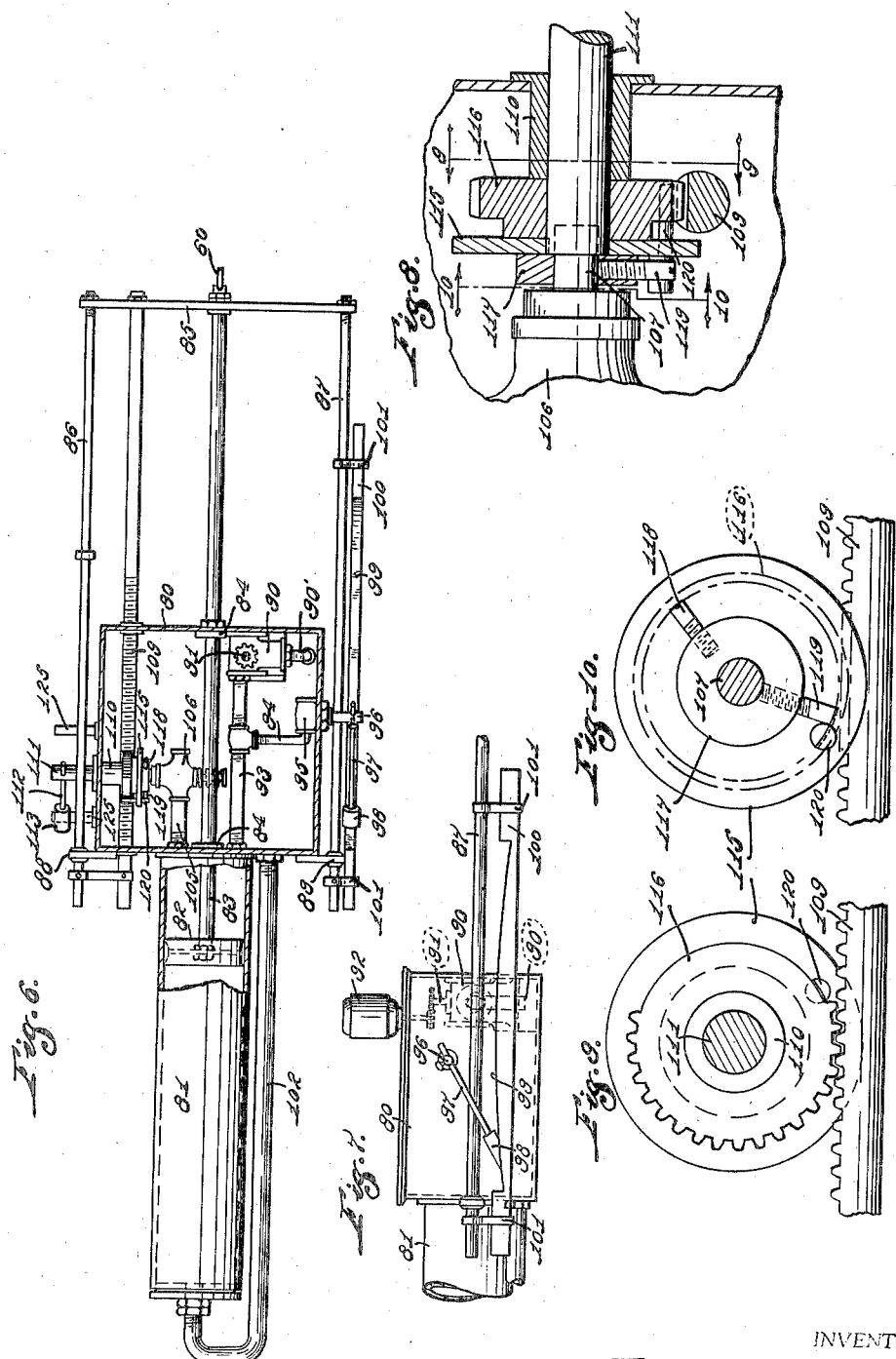

Patented Oct. 1, 1940

2,216,154

UNITED STATES PATENT OFFICE 2,216,154

AUTOMATIC SPRINKLER

Frank Blaschke, Maywood, Ind.

Application February 15, 1939, Serial No. 256,565

9 Claims. (Cl. 299—62)

The object of my invention is to provide improvements in overhead irrigation mechanisms by which a plurality of overhead spray pipes, having an aggregate capacity exceeding current water supply, may be automatically connected to and disconnected from the water supply so that individual spray pipes may be supplied with an adequate supply of water at predetermined periods.

The accompanying drawings illustrate my invention:

Fig. 1 is a side elevation of my improved operating mechanism for a single spray pipe;

Fig. 2 a plan of one form of valve operating mechanism;

Fig. 3 a fragmentary section on line 3 of Fig. 1;

Fig. 4 a fragmentary section on line 4 of Fig. 1;

Fig. 5 a diagrammatic illustration of a group of spray units manipulated from a common source of power;

Fig. 6 a plan, in partial horizontal section, of a modified apparatus for oscillating the pipes 11;

Fig. 7 a side elevation of the parts shown in Fig. 6;

Fig. 8 an axial sectional detail of the means for manipulating the exhaust valve shown in Fig. 6;

Fig. 9 a section on line 9—9 of Fig. 8; and

Fig. 10 a section on line 10—10 of Fig. 8.

In the drawings, 10 indicates a suitable supporting frame in which is journaled a horizontally extended water pipe 11 of a form common in overhead sprinkling systems and having a plurality of jet outlets (not shown) at spaced intervals along its length. The inlet end of pipe 11 is associated by a suitably packed rotative connection with a supply pipe 12 having a valve 13 therein. Connected to pipe 11 and longitudinally adjustable thereon, by means of a temper screw 14, is a pinion 15 adapted to mesh with a segment gear 16 carried by a rock lever 17 journaled at 18 on frame 10.

Secured to shaft 11 is a pawl-carrying arm 20 provided with a pawl 21 biased in one direction by spring 22. Journaled on pipe 11, in position to be engaged by pawl 21, is a ratchet wheel 23 provided with a hub 24, a portion of the circumference of which is engaged by a friction shoe 25. Angularly adjustable upon hub 24 are two collars 26 and 27, respectively, carrying radially projecting fingers 26′ and 27′. Finger 26′ is pivoted, at 28, on collar 26 and is spring biased, to the position shown in Fig. 1, by spring 29. Finger 27′ is rigid relative to collar 27. Located below collars 26 and 27, on a vertical axis, is a rocker disc 31 having a projecting arm 32 connected by link 33 with the operating arm 34 of valve 13. Rising from disc 31 in the path of movement of finger 26′ is a pin 35. Pin 35 and finger 26′ are relatively cammed so that, when finger 26′ has acted upon pin 35 to shift disc 31 in a direction to close valve 13 further progress of finger 26′ causes said finger to swing upon its axis so as to slip by pin 35 and proceed upon its course.

Pivotally mounted upon disc 31, at 40, is a bellcrank lever 41 carrying a pin 42 in the path of movement of finger 27′, lever 41 is biased by spring 43 against a stop 44, the arrangement being such that when finger 27′ has acted upon pin 42 to swing disc 31 to open valve 13, pin 42 will yield to permit finger 27′ to proceed upon its course.

It will be readily understood that the finger-pin group 26′—25, may be substituted for the finger-pin group 27′—42, or vice versa.

Arranged adjacent ratchet wheel 23 is a guard ring 50 of limited circumferential extent and circumferentially adjustable in a holder 51 carried by frame 10. Pawl 21 is provided with a finger 52 adapted to engage and ride upon the guard ring 50 during a portion of the stroke of arm 20, depending upon the circumferential adjustment of the guard, so that, for a greater or lesser extent of the angular movement of arm 20, pawl 21 will not engage the teeth of ratchet wheel 23, so that the number of strokes of arm 20 required to produce a complete rotating of ratchet wheel 23 may be varied by adjustment of guard 50.

A plurality of pipes 11 with the associated mechanisms, as above described, are arranged in parallelism at appropriately spaced intervals over the field to be irrigated, this spacing being equal to twice the maximum trajectory of the water jets and the several segments 17 are connected by a cable 60 provided at one end with a counterweight 61 and connected at the other end to a winding drum 62 provided with a ratchet 63. Journaled coaxial with the drum 62 and wheel 63 is a pawl-carrying arm 64 having a spring biased pawl 65 adapted to engage ratchet wheel 63. Arm 64 may be rotated by any suitable power train 66 connected to a source of power 67. Arranged adjacent arm 64 is a fixed cam plate 68 having a cam portion 69 of limited circumferential extent arranged in the path of movement of a finger or roller 70 carried by pawl 65.

The power train shown in the drawings is highly conventionalized and is intended to indicate a relatively high speed reduction between the power unit and the arm 64 so that a comparatively long period will be required for a complete rotation of arm 64. Drum 62 is of sufficient diameter so that nearly one complete rotation of the drum will cause a complete swing of segments 17 and, just at the close of completion of the swing of segments 17, finger 70 of pawl 65 comes into engagement with cam 69 so that pawl 65 is momentarily retracted from engagement with ratchet wheel 63, whereupon counterweight 61 quickly returns segments 17 to initial position, whereupon the drum is again picked up by pawl 65 as finger 70 passes beyond cam 69.

Finger 26' having caused an opening of valve 31, water will flow into and through pipe 11. Reciprocation of segments 17, in course of time, through the medium of pawl 21 and ratchet wheel 23, will bring finger 27' into position to cause closing of the water valve and, in due course, continued reciprocation of the segments 17 will cause a re-opening of the water valve. The length of time during which the water may be supplied to the pipe 11 will depend upon the adjustment of collar 27 relative to collar 26.

By suitably adjusting the collars 26 and 27 upon their respective pipes, water may be delivered selectively to any of the pipes 11 for predetermined periods and at selected intervals.

If it is desired at any time to render inactive any one of the pipes 11, the pinion 15 thereon may be shifted axially out of engagement with the adjacent segment 17.

The apparatus previously described, and shown in Fig. 5, for manipulating the cable 60 moves the cable 60 in one direction at a uniform speed and consequently irrigation of the ground closely adjacent each pipe 11 is more profuse than that of areas more distant from each pipe at each side thereof.

To overcome this difficulty, I may substitute for the parts 62 to 70 inclusive, the mechanism shown in Figs. 6 to 10 inclusive. In this apparatus, the box 80 carries a horizontally extending cylinder 81 in which is reciprocably mounted the piston 82 provided with a piston rod 83 which passes through suitable packing glands 84—84 in the opposite side walls of box 80 and connected to a cross head 85 carrying parallel rods 86 and 87 reciprocably supported, respectively, in bearings 88 and 89 carried by box 80.

Mounted in box 80 is an oil pump 90, the shaft 91 of which is driven by an electric motor 92. Pump 90 obtains its supply of oil through an induction pipe 90', opening near the bottom of box 80, which discharges through a pipe 93 into one end of cylinder 81. Connected to pipe 93 is a bleed passage 94 which discharges through a controlling valve 95, the stem 96 of which carries an arm 97 provided with a head 98 which rides on a cammed surface 99 of a cam bar 100 connected by hangers 101 with rod 87 so as to move therewith, the arrangement being such that, as cam 100 is shifted longitudinally from one extreme to the other, valve 95 will be first gradually opened and then gradually closed, for a purpose which will appear.

Connecting with the end of cylinder 81 opposite the point of entry of pipe 93 is a pipe 102 connecting with the lower region of box 80.

Leading from that end of cylinder 81 into which pipe 93 discharges, is a discharge pipe 105 outflow from which is controlled by a valve 106 having a valve stem 107.

Journaled in bearing 110 carried by one sidewall of box 80 in alinement with valve stem 107 is a shaft 111 provided with a radial arm 112 having a counterweight 113 at its outer end.

Keyed to shaft 111 is a disc 115, adjacent which is a mutilated gear 116 freely rotatable on shaft 111 and meshing with rack 109. Gear 116 is mutilated through an angle equal to that necessary to move valve stem 107 from open to shut position and, secured to stem 107, is a collar 117 carrying two radial pins 118 and 119, angularly spaced to the extent of mutilation of gear 116 and the throw of stem 107. Disc 115 carries a pin 120, one end of which lies between pins 118 and 119 and the other end of which lies in the mutilated portion of gear 116.

Assuming piston 82 to be in the position shown in Fig. 6, sufficient oil is poured into box 80 to fill the lefthand end of cylinder 81, pipe 102, and a surplus in box 80 sufficient to more than fill the righthand end of cylinder 81. The motor 92, running continuously, discharges oil from box 80 through pipe 93 into the right hand end of cylinder 81, a portion of the pump discharge passing through the bleed valve 95 which, with the parts in the position shown in Figs. 6 and 7, is a minimum. Piston 82 will be driven to the left. At the beginning of this movement, counterweight 113 is in a depending position and may, if desired, rest upon a stop 125. Valve 106 is closed. As piston 82 moves to the left, it drives the frame 85—86—87 to the left, rack bar 109 rotates gear 116 and, by engagement with pin 120, moves disc 115 and shaft 111 to carry counterweight 113 to and past its highest point, just before frame 85—86—87 reaches the limit of its lefthand movement, at which time the mutilated portion of gear 116 arrives opposite rack 109 so that the unbalanced counterweight 113 may cause pin 120 to engage pin 119 and open valve 106. During these movements, cam 100 is being moved under block 98 to gradually increase the effective outlet from bleed valve 95, until piston 82 reaches the middle of its stroke, at which time pipes 11 will have their spray outlets directed vertically, and then to gradually decrease the effective outlet of bleed valve 95 to the end of the stroke.

So soon as valve 106 is open, the counterweight 61 becomes effective on cable 60 to permit rapid return of piston 82, the outlet through valve 106 being large enough to permit rapid discharge of the oil in the righthand end of cylinder 81 as well as the oil which is arriving from pump 90.

During the return stroke, cam 100 is effective to adjust the bleed valve 95 and, as discharge through this bleed valve is effective to control the relative rate of return movement of piston 82, the differential oscillation of the pipe 11 on the return stroke is proportionately the same as the differential pipe movement on the forward stroke. By this arrangement, the rate of oscillation of pipe 11 when the discharge outlets are vertically, or nearly vertically, directed, is less than when the discharge outlets are in their maximum positions toward the horizontal, the rate of cam 100 being proportioned to vary in accordance with the cosines of the angles of inclination of the orifices of pipes 11 so that the amount of water delivered upon the ground in the area closely adjacent the pipes 11 will be approximately the same as the amount of water delivered to the ground at more distant points.

It will be noted that by means of the above described mechanism, each pipe 11 may be given any desired number of oscillations during the period of water supply. I have found that this arrangement is highly desirable. The forward half of each oscillation is comparatively slow and at such rate that the water is not delivered to any given spot on the area beyond the capacity of the ground at that spot to absorb the water within the limited period following that of actual deposit. The return stroke of each oscillation, under the action of the counterweight, is quite rapid and, by the time of the return stroke, the ground first wetted at the beginning of the forward stroke is in condition to receive another charge of water so that there will be comparatively little run off.

It will be readily understood that the character of the intermittent connection between the rotative valve of actuating element 24, and the valve, may be modified through a wide range, depending upon the characteristics of the valve, without departing from my invention as defined in the appended claims.

I claim as my invention:

1. Irrigation apparatus comprising, an oscillable overhead spray pipe, a valve controlling water flow to said spray pipe, means for oscillating said spray pipe about its axis, a rotative valve actuator provided with two relatively adjustable, circumferentially spaced members arranged to alternately open and close said valve, and ratchet means interposed between said spray pipe and said valve actuator to rotatively advance the actuator, whereby repeated oscillations of the spray pipe will be required for completion of the valve cycle.

2. Irrigation apparatus comprising, an oscillable overhead spray pipe, a valve controlling water flow to said pipe, a rotative valve actuator journaled on said spray pipe, ratchet means interposed between said spray pipe and the said actuator whereby oscillation of the pipe will cause progressive circumferential movement of the actuator, means for oscillating the pipe, an oscillable element connected to the valve, a pair of radial projecting fingers carried by the rotative valve actuator, one being circumferentially adjustable relative to the other, and a second oscillable element carrying a pair of pins arranged in the paths of travel of said fingers, a connection between said second oscillable element and the first-mentioned oscillable element, one of each finger-pin group being spring biased relative to the other whereby yielding of the spring biased element will permit procedure of the rotative actuator after the valve has been moved to one of its limits.

3. Irrigation apparatus comprising, an oscillable overhead spray pipe, a valve controlling water flow to said pipe, means for oscillating said spray pipe about its axis, a rotative valve actuator journaled on said spray pipe and provided with a radially projecting finger, an oscillable element arranged to be oscillated by said actuator, a connection between said oscillable element and the valve, and a spring biased pin carried by said oscillable element in the path of travel of part of the actuator whereby, upon movement of the valve to one of its extremes, said pin will yield to permit procedure of the rotative actuator.

4. Irrigation apparatus comprising, an oscillable overhead spray pipe, a valve controlling water flow to said pipe, means for oscillating said spray pipe about its axis, a rotative valve actuator journaled on said spray pipe and provided with a radially projecting finger spring biased to yield axially of the pipe, an oscillable element connected to the valve and provided with a pin arranged in the path of travel of said finger whereby, upon movement of the valve to one extreme, the finger may yield axially of the spray pipe to continue its forward movement.

5. Irrigation apparatus comprising, an oscillable overhead spray pipe, a pinion carried by said pipe, an oscillable segment meshing with said pinion, a winding drum, a cable connecting said oscillating segment with said winding drum, a counterweight connected to said cable in opposition to said drum, a ratchet driving train for said drum, and a cam arranged in the path of travel of said ratchet to temporarily disconnect the motive power from said drum to permit the counterweight to return the segment to initial position.

6. In an irrigation apparatus comprising, a horizontal oscillable pipe having radial spray outlets and a lever mechanism and counterweighted pull cable for oscillating said pipe, a fluid motor mechanism for actuating said cable in opposition to said counterweight, comprising a container, a cylinder and associated piston, a discharge conduit between one end of said cylinder and the container, a valve controlling said discharge conduit, a rack operated by said piston, a mutilated gear meshing with said rack, a horizontal shaft having a radial arm carrying an overbalancing weight, a lost-motion connection between said mutilated gear, said overbalancing weight, and said valve, whereby, as said overbalancing weight passes its peak position, the valve will be actuated, and a pump having an inlet from said container and an outlet communicating with the valved end of the cylinder.

7. Apparatus of the character specified in claim 6 wherein the opposite end of of the cylinder is in constant gravity communication with the container.

8. In an irrigation apparatus comprising, a horizontal oscillable pipe having radial spray outlets and a lever mechanism and counterweighted pull cable for oscillating said pipe, a fluid motor mechanism for actuating said cable in opposition to said counterweight, comprising a container, a cylinder and associated piston, a discharge conduit between one end of said cylinder and the container, a valve controlling said discharge conduit, a rack operated by said piston, a mutilated gear meshing with said rack, a horizontal shaft having a radial arm carrying an overbalancing weight, a lost-motion connection between said mutilated gear, said overbalancing weight, and said valve, whereby, as said overbalancing weight passes its peak position, the valve will be actuated, a pump having an inlet from said container and an outlet communicating with the valved end of the cylinder, a bleed valve in the pump outlet, a cam connected with the piston, and an actuating member connected with the bleed valve and engaged by said cam, whereby the bleed valve is variably positioned by piston movement.

9. Apparatus of the character specified in claim 8 wherein the opposite end of the cylinder is in constant gravity communication with the container.

FRANK BLASCHKE.